March 26, 1935. J. C. TRAVILLA, JR 1,995,525
RAILWAY TRUCK
Filed June 13, 1931 2 Sheets-Sheet 2
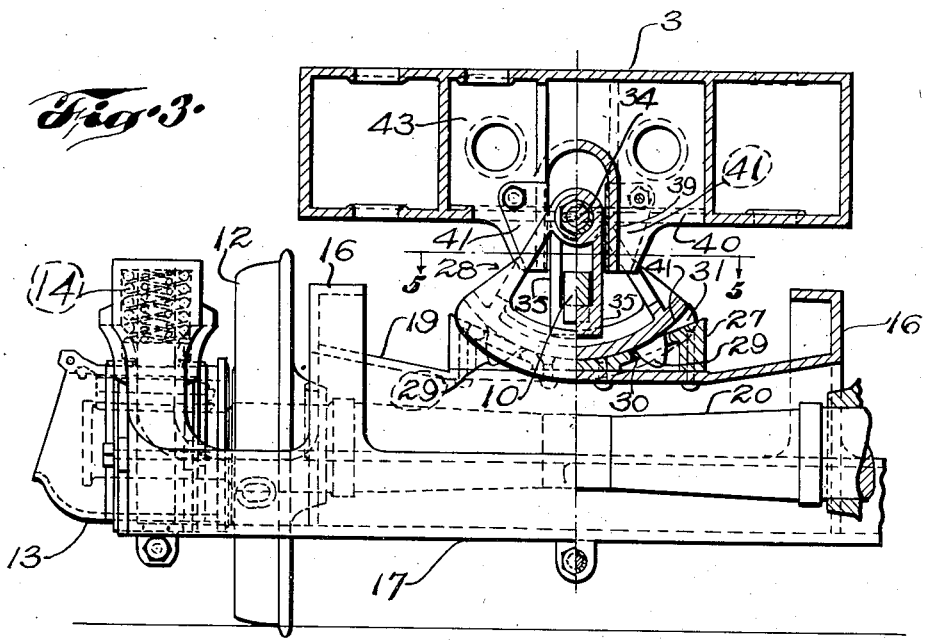
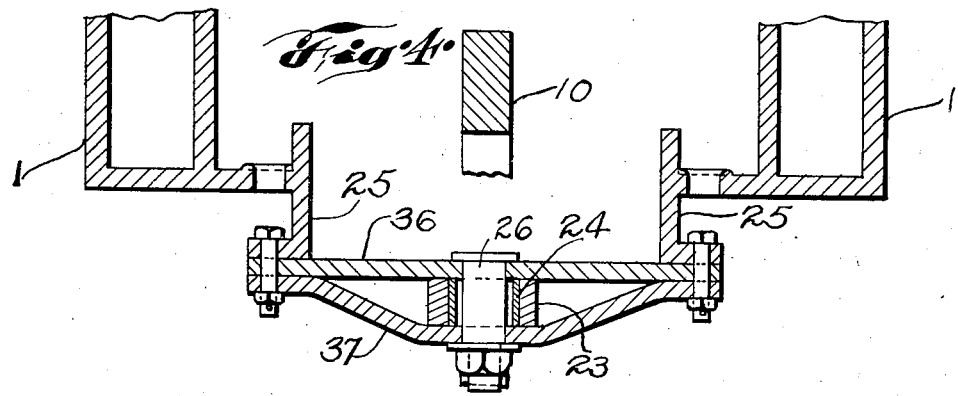
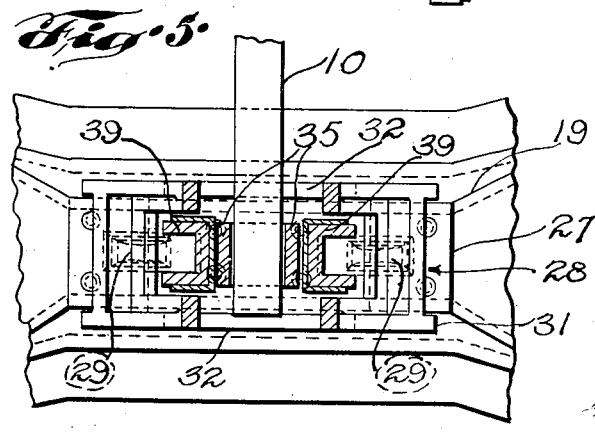
Inventor
James C Travilla Jr.
By Rodney Bedell
Attorney Patented Mar. 26, 1935

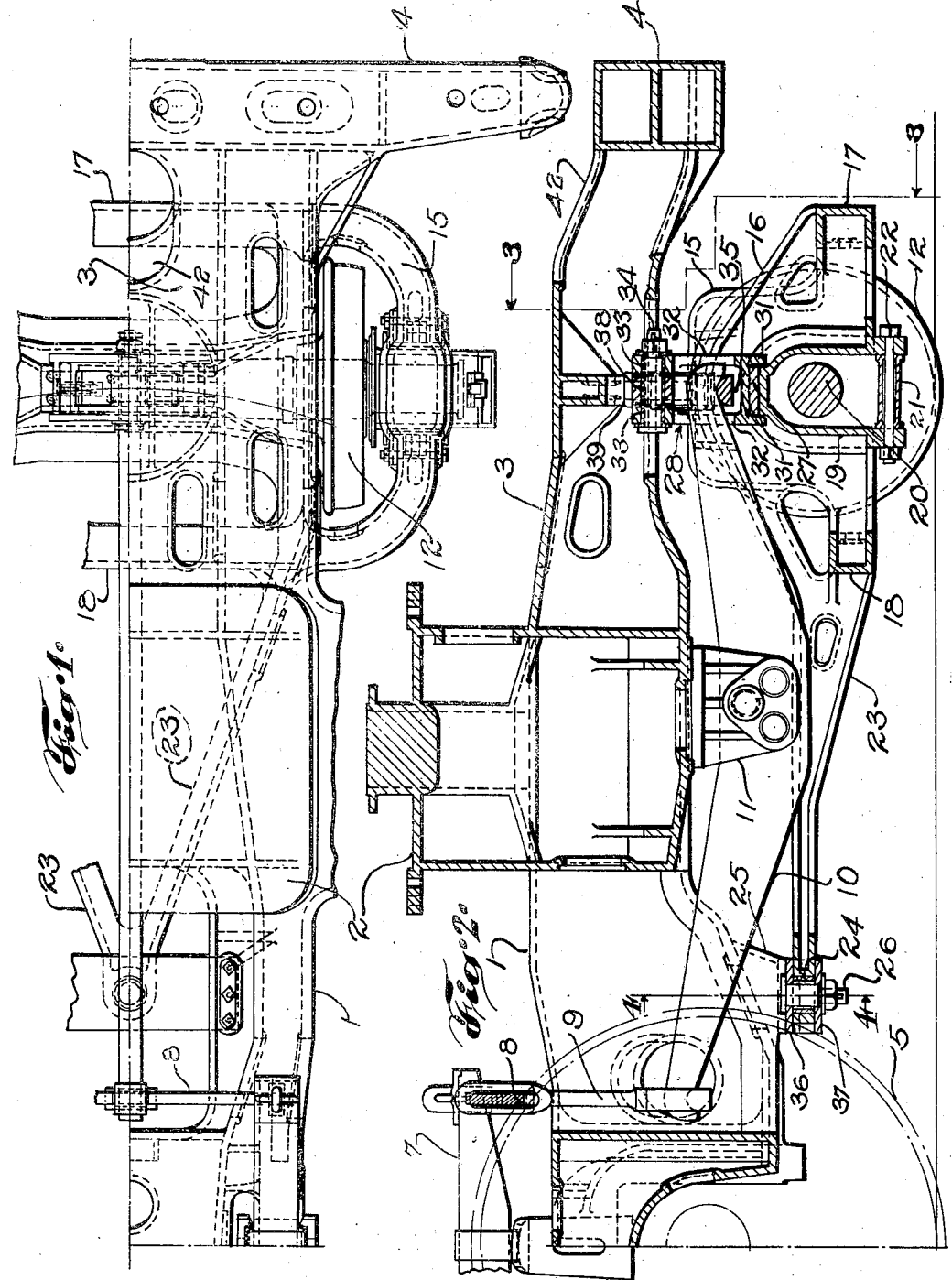

1,995,525

UNITED STATES PATENT OFFICE 1,995,525

RAILWAY TRUCK

James C. Travilla, Jr., Philadelphia, Pa., assignor to General Steel Castings Corporation, Granite City, Ill., a corporation of Delaware Application June 13, 1931, Serial No. 544,184

23 Claims. (Cl. 105—174)

This invention relates to railway rolling stock and consists in a novel locomotive underframe and leading truck of the radius bar type, and particularly the truck centering means.

Centering devices in locomotive leading trucks are usually mounted on a truck transom member and support a swinging bolster, usually through rockers. Rockers of various shapes and sizes have been developed for this purpose which engage seats of suitable design secured to the transom and the bolster. The front deck of the locomotive is provided with a center pin guide which rests upon the truck bolster center plate, and a center pin is inserted through the guide and center plate for maintaining the assembly. Leading trucks are frequently equalized with the driver springs by means of a substantially horizontal member which is suspended from the driver springs at one end and is carried by the truck bolster at the other end.

When the rockers function in this arrangement, the bolster moves laterally in a direction perpendicular to the longitudinal axis of the truck. In order to permit the swiveling movement of the truck about the radius bar pivot, the bolster must have some movement longitudinally of the underframe. The maximum longitudinal movement is not great and is usually cared for by clearance between the truck bolster and the frame wear plates and by slippage between the bolster and rockers or rockers and transom.

The main objects of the present invention are to simplify the construction of the leading truck, decrease the number of machine operations necessary, improve the truck appearance, and decrease the weight thereof, by materially decreasing the number of parts used in constructing the truck.

Another object is to locate the centering device above the truck in such a position as to facilitate inspection and lubrication.

Another object is to lengthen the period of usefulness of the centering device by eliminating slippage between the rocker and supporting transom.

These objects and others are attained substantially by eliminating the swinging bolster and supporting the front end of the driver and truck equalizer upon a rocker which is in turn mounted upon a truck transom member.

In the drawings which illustrate the invention—

Figure 1 is a fragmentary top view of a locomotive underframe and a portion of a leading truck embodying the invention.

Figure 2 is a vertical section taken on the longitudinal center line of the structure shown in Figure 1.

Figure 3 is a vertical transverse section taken in part on the line 3—3 of Figure 2, and in part on a vertical plane extending through the truck axle.

Figure 4 is a detail vertical transverse section taken on the line 4—4 of Figure 2.

Figure 5 is a detail horizontal section taken on the line 5—5 of Figure 3.

The portion of the locomotive underframe shown includes side members 1, a cylinder saddle structure including smoke box saddle 2, a box shaped front deck structure 3, and a pilot beam 4. Front drivers 5 mount the usual driving boxes (not shown), and driving box saddles 6 support the driver springs 7. A transverse equalizer 8 extends between the front pair of driver springs 7 and at the middle mounts a hanger 9 which at its lower extremity supports the rear end of equalizer 10. The equalizer is fulcrumed in a bracket 11 depending from the underframe beneath saddle 2.

The leading truck has a pair of wheels 12 mounting outside journal boxes 13 and springs 14. The truck frame includes side members 15 and 16 positioned outside and inside the wheels 12, respectively, and transoms 17, 18, and 19. Transom 19 is of inverted U-shaped section and partially encloses axle 20, and has a central spacer and bolt 21 and 22. Radius bars 23 extend rearwardly from transom 18 and merge at their rear ends to receive a bushing 24 which is confined between two plates 36 and 37, bolted to brackets 25 on the underframe. A radius bar pin 26 fits loosely within bushing 24 in order to permit the truck to move longtiudinally during the swiveling of the truck, as will be hereafter explained.

Inverted U-shaped truck transom 19 has a concave seat 27 secured to the top thereof which mounts a segmental rocker indicated generally at 28. Rocker 28 has a pair of teeth 29, which fit into corresponding openings or recesses 30 in the concave surface of seat 27, and depending flanges 31, which engage the sides of seat 27 and serve to guide the rocker. The teeth 29 prevent slippage from occurring between the rocker and its seat 27.

Rocker 28 is composed of a convex lower bearing surface 51, from which teeth 29 project, and spaced sides 32 which have aligned openings in their top ends provided with bushings 33 for receiving a cylindrical pin 34. Pin 34 also pivotally mounts a loop hanger 35 which is positioned between the sides 32 of the rocker and which supports the front end of equalizer 10. Lateral motion is transmitted to the centering device by means of spaced guides 39 having wearing plates 41, the guides being illustrated as formed integral with the transverse web 43 extending between the top and bottom webs of deck 3, and projecting downwardly through an opening 40 in the lower web. The guides extend between the sides 32 of rocker 28 and engage the sides of hanger 35, holding the hanger in a vertical position during rolling of the rocker.

It will be seen that the equalizer bar will be retained sidewardly by guides 39 and hanger 35 during swiveling of the truck, but will not be subjected to other horizontal forces. The movement of the rocker on its seat will be pure rolling and in a plane paralleling the transverse axis of the truck, and the resulting slight longitudinal movement of the rocker relative to the underframe is provided for by the movement of the truck, itself, as permitted by the loose fitting of the radius bar pin within its bushing. Teeth 29 are added to the rocker to further obviate the possibility of slippage between rocker and seat and thus increase the life of the rocker which bears the load applied to the truck. The hanger 35 will receive some wear but may be easily replaced.

The number of truck parts in the novel device is considerably less than in the usual types of two wheel leading trucks and, consequently, the weight of the truck and the amount of machining necessary is decreased, and its appearance is improved. Through more advantageous distribution of metal, the truck is of strength equal to or greater than those of previous design and is perfectly stable since the point of application of the load is the same as in previous trucks of similar type. In case of equalizer failure, the truck will continue to function as a front guide for the locomotive.

The only parts of the novel centering device requiring lubrication are the hanger pin and guides, and these may be readily reached at the same time from the top of the underframe deck through openings 42 and 40. Inspection is made easy because the device is located above the truck instead of between a truck bolster and transom.

Obviously, the invention is not limited to the details of the embodiment selected for the purpose of illustration and various modifications such as the substitution of a truck frame having inside journals or a frame arranged for four wheels instead of two, may be made without departing from the spirit thereof and I contemplate the exclusive use of all such modifications as come within the scope of my claims.

I claim:

1. A rocker for a truck centering device comprising a lower bearing surface and a top load supporting bearing, there being a recess in said rocker extending below said bearing for accommodating a load supporting hanger pivotally supported from said bearing.

2. A centering device for a railway truck including a rocker having a lower bearing surface for resting upon a truck frame member, a tooth depending from said surface for engaging said member to prevent slippage, and a substantially upright portion above said surface, and a hanger carried by said portion for supporting the rocker load.

3. A centering device for a railway truck including a rocker having spaced side members, a curved bearing surface connecting the lower ends of said members, an element extending between and supported by said members near the tops thereof, and a hanger suspended from said element between said members for supporting the rocker load.

4. A centering device for a railway truck including a rocker having a lower bearing surface for resting upon a truck frame member, a flange depending on each side of said surface for engaging a rocker seat to guide said rocker, a tooth depending from said surface for engaging said member to prevent slippage, and a substantially upright portion above said surface, and a hanger carried by said portion for supporting the rocker load.

5. In combination, a locomotive truck including a transom member and a radius bar projecting substantially horizontally from said member, and a centering device resting on the upper surface of said member and including a rocker and a hanger carried thereby for supporting the rocker load.

6. In a locomotive truck, a pair of wheels and an axle including journals, a frame supported on said journals and including a U-section transom partially enclosing said axle, a transverse bearing in said transom, and a centering device including a rocker supported on said bearing and a hanger pivotally supported by said rocker and adapted to support the rocker load.

7. In a locomotive truck, spaced journals, springs carried by said journals, a frame carried on said springs, radius bars projecting longitudinally from said frame, and a transverse bearing on said frame, and a centering device including a rocker mounted on said bearing and a hanger pivoted to said rocker for supporting the rocker load.

8. In a locomotive truck, spaced journals, a frame supported on said journals, and a transverse bearing in said frame, and a centering device including a rocker supported on said bearing and a hanger carried by said rocker for supporting the end of an equalizer bar, said hanger being arranged to pivot relative to said rocker in the plane of movement of said rocker.

9. In combination, a locomotive underframe, a truck, a centering device including a rocker mounted on said truck and a load carrying member pivotally suspended on said rocker, and a guide element on said underframe for engaging said member and transmitting lateral forces between said underframe and device.

10. A locomotive underframe including a box section front deck structure having top and bottom webs, there being an opening in said bottom web, and a pair of spaced guide elements depending through said opening for transmitting lateral forces between said underframe and a truck centering device.

11. A locomotive underframe including a box section front deck structure having top and bottom webs, and spaced guides depending from said structure for transmitting lateral forces between said underframe and a rocker centering device, said top web being shaped to permit access to said guides and the centering device for inspection and lubrication.

12. In a locomotive underframe, a front deck member, a radius bar pin bracket and an equalizer fulcrum spaced from said member, and a plurality of spaced guides depending from said member for engaging a truck centering device and transmitting lateral forces between said underframe and device.

13. In a locomotive, an underframe, a leading truck including a transom and radius bars pivotally secured to said underframe, a centering device including a rocker rollable transversely of said truck on said transom, and an equalizer bar fulcrumed on said underframe and supported at one end by said rocker.

14. In a locomotive, an underframe having spaced guides depending therefrom, a leading truck including a transom and a radius bar pivotally secured to said underframe, a centering device including a rocker rollable transversely of said truck on said transom and a hanger pivotally mounted on said rocker, and an equalizer bar fulcrumed on said underframe and supported at one end by said hanger, said guides engaging opposite sides of said hanger and serving to transmit lateral forces between said underframe and said centering device.

15. In a locomotive, an underframe having spaced guides depending therefrom; a leading truck including a transom and a radius bar extending longitudinally thereof and including an end portion having an opening therein; a centering device including a rocker mounted to roll transversely of the truck on said transom and a hanger secured to said rocker, and swingable transversely of the truck and engaging said guides; an equalizer bar fulcrumed to said underframe and supported at one end by said hanger; and a radius bar pin fitting loosely within said opening and pivotally connecting said radius bar to said underframe, said truck being movable longitudinally relative to said underframe during swiveling of the truck about said pin.

16. In combination, a truck centering device rocker comprising a lower bearing surface, and an upright portion having a recess above said surface, and a load supporting hanger suspended from said upright portion and projecting into said recess.

17. A centering device for a railway truck including a rocker having an upper bearing, a lower bearing surface for resting on the truck frame, and a hanger carried by said upper bearing and arranged for supporting the rocker load at a point below and in substantially vertical alinement with said upper bearing.

18. In a centering device for a railway truck, a rocker, and a hanger pivoted on said rocker and having a load engaging element located directly beneath the hanger pivot.

19. In a locomotive truck, a frame, a rocker seat member having inclined rocker supporting surfaces, a rocker having cylindrical surface contact with said member, a hanger pivotally supported by said rocker, and a load carrying equalizer supported by said hanger.

20. In a locomotive, the combination of an underframe and a centering device including a rocker, and a guide element projecting downwardly from said underframe and engaging said rocker for transmitting lateral forces between said rocker and element, and said element providing for relative vertical movement between said rocker and element.

21. In a locomotive, the combination of an underframe and a centering device including a rocker having a lower bearing surface and an upper load carrying bearing, and a guide element on said underframe for said centering device for transmitting lateral forces between said underframe and device, said element projecting below said bearing.

22. A centering device for a railway truck including a rocker having a bearing for engaging the truck, and a load supporting element swingably carried directly by said rocker from a point located in substantially vertical alinement with the part of the rocker engaging the truck.

23. In a centering device for a railway truck, a rocker, a hanger pivoted on said rocker and having a load engaging element located in substantially vertical alinement with the hanger pivot.

JAS. C. TRAVILLA, Jr.